United States Patent [19]

Podmaniczky et al.

[11] 4,371,964
[45] Feb. 1, 1983

[54] CIRCUIT ARRANGEMENT FOR CONTROLLING A MULTI-BEAM ACOUSTO-OPTICAL CELL IN WHICH BRAGG DIFFRACTION IS USED FOR THE GENERATION OF A PLURALITY OF OUTGOING LASER BEAMS

[75] Inventors: Andras Podmaniczky; Szabolcs Tokes; Attila M. Lenk, all of Budapest, Hungary

[73] Assignee: Magyar Tudomanyos Akademia Szamitastechnikai es Automatizalasi Kutato Intezete, Budapest, Hungary

[21] Appl. No.: 138,420

[22] Filed: Apr. 8, 1980

[30] Foreign Application Priority Data

Apr. 18, 1979 [HU] Hungary .............................. MA 3134

[51] Int. Cl.$^3$ ............................................... H01S 3/00
[52] U.S. Cl. ........................................ 372/38; 372/33; 372/25; 372/13
[58] Field of Search ........................ 350/355, 356, 358; 331/94.5 M, 94.5 S

[56] References Cited

PUBLICATIONS

Electro–Optics/Laser International '760K, "A New Multichannel Acousto–Optic Light Modulator in TeO$_2$ Crystals," Mar. 1976.
"Multifrequency Acousto–Optic Page Composers for Holographic Data Storage," Eschler; Opt. Commun., vol. 13 No. 2, Feb. 1975.
"Some Properties of TeO$_2$ Light Deflectors with Small Interaction Length," Podmaniczky, Opt. Commun., vol. 16, No. 1, Jan'76.

Primary Examiner—William L. Sikes
Assistant Examiner—Léon Scott, Jr.
Attorney, Agent, or Firm—Karl F. Ross

[57] ABSTRACT

A circuit arrangement for controlling a multi-beam acousto-optical cell in which Bragg diffraction is used for the generation of a plurality of outgoing laser beams, in which the acousto-optical cell has at least one ultrasonic transducer from which the outgoing laser beams are coming out in a common plane, the circuit arrangement comprises VHF or UHF oscillators coupled through respective control stages to the ultrasonic transducers. The frequency of each oscillator defines the diffraction angle of an associated outgoing laser beam the intensity of which is dependent from the amplitude of the oscillator. The passage of the oscillator outputs towards the respective ultrasonic transducers is controlled by the control stages according to predetermined operational requirements.

In order to enable the generation of outgoing laser beams with variable diffraction angles within the common plane of the outgoing beams at least one of the high frequency oscillators is designed as an oscillator of variable frequency having a frequency determining input. By means of applying a control voltage to this frequency determining input the diffraction angle of the corresponding outgoing laser beam can be adjusted during operation which has advantages in certain fields of application.

7 Claims, 6 Drawing Figures

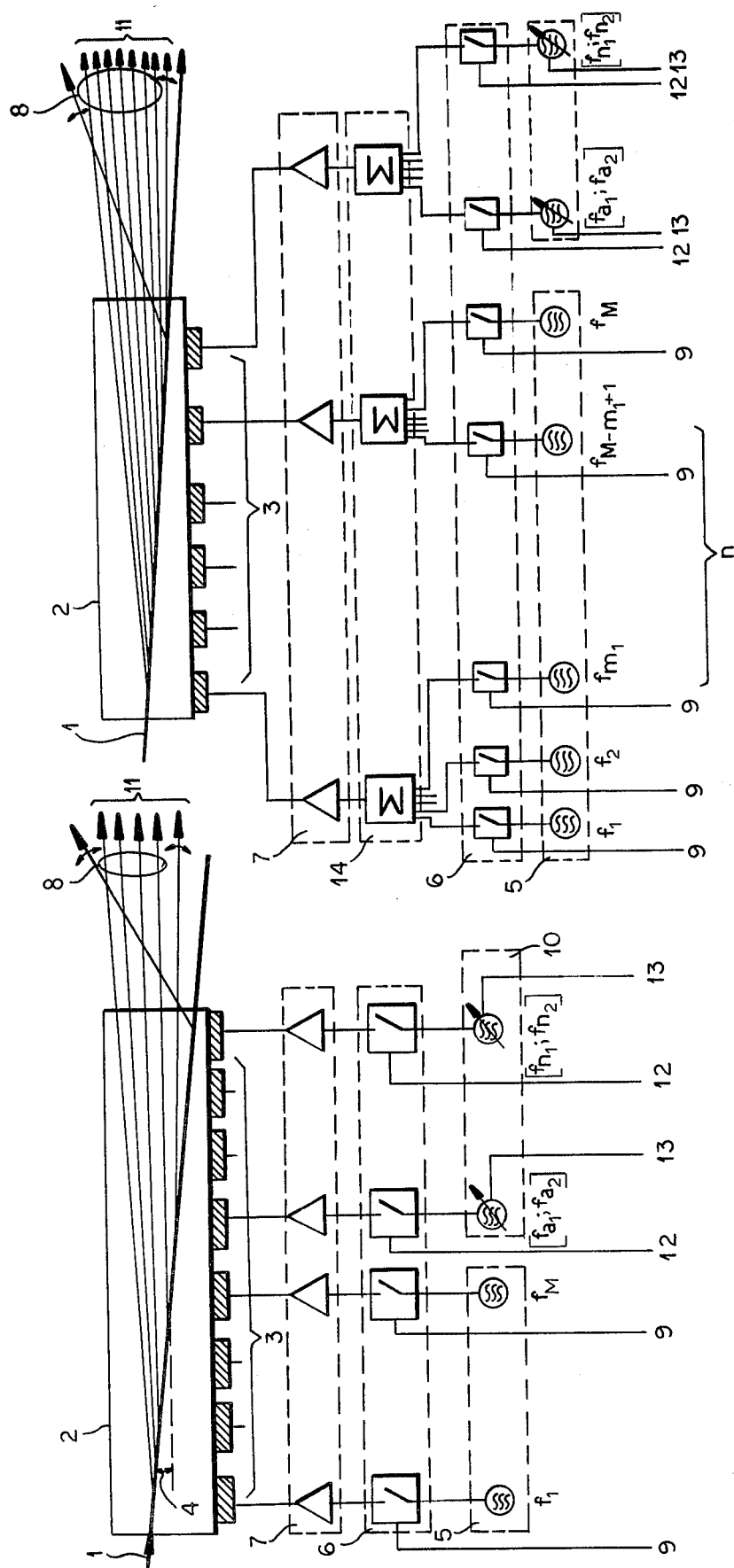

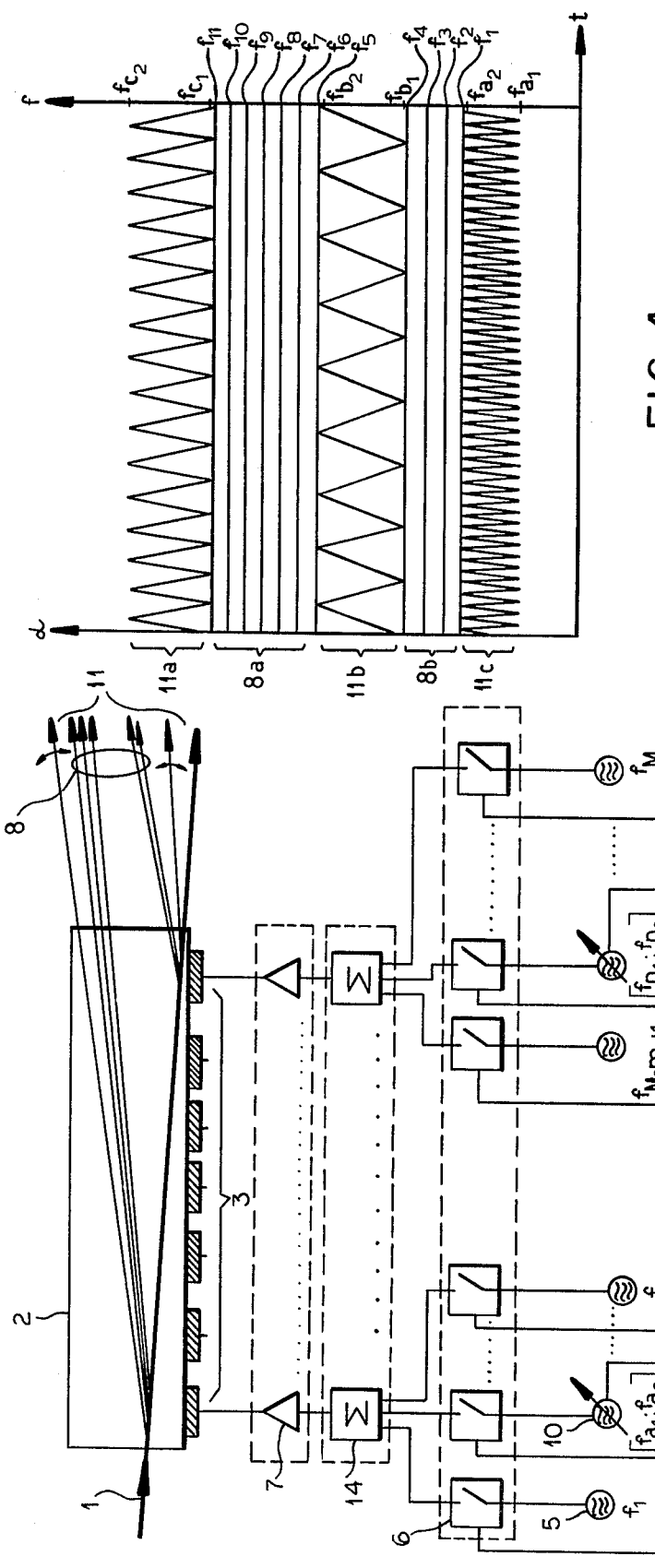

CIRCUIT ARRANGEMENT FOR CONTROLLING A MULTI-BEAM ACOUSTO-OPTICAL CELL IN WHICH BRAGG DIFFRACTION IS USED FOR THE GENERATION OF A PLURALITY OF OUTGOING LASER BEAMS

FIELD OF THE INVENTION

The invention relates to acousto-optical modulators and particularly to a circuit arrangement for controlling a multi-beam acousto-optical cell in which Bragg diffraction is used for the generation of a plurality of outgoing laser beams.

BACKGROUND OF THE INVENTION

The DE-OS No. 2 755 575 relates to a laser operated character generator in which the laser beams that write the characters are generated in a single acousto-optical modulator, and the angles of diffraction of the beams are constant in time. In the acousto-optical modulator described in this publication, VHF oscillators are used and each oscillator is coupled through a respective control stage associated therewith to a respective ultrasonic transducer of the acousto-optical cell. The frequency of each oscillator determines the direction of the corresponding outgoing laser beam and its amplitude defines the intensity of this beam. The control signals applied to the control inputs of the control stages enable or inhibit the passage of the output voltages of the associated oscillators towards the corresponding ultrasonic transducers.

In equipment using acousto-optical modulators (e.g. in laser-operated character generators) outgoing laser beams with constant diffraction angles are generated, and these beams are deflected in a direction normal to the common plane of their generation by means of a separate deflecting means (e.g. by a swinging mirror or by an additional acousto-optical modulator). The position adjustment of the laser beams in their common plane of generation is carried out generally by means of an additional swinging mirror. Such a position adjustment can be used for compensating the effect of the fluctuation of the rotational speed of the recording cylinder.

It has been discovered that the field of application of acousto-optical modulators can be widened, if in addition to the laser beams leaving the acousto-optical cell with a constant diffraction angle, the generation of additional outgoing laser beams could be effected for which the diffraction angle of the additional laser beams could be changed according to a predetermined controlling program either with high or low rates without the need of using any additional active optical device.

It has been discovered furthermore, that it would be preferable if the common position adjustment of the outgoing laser beams within their common plane of propagation could be effected electronically in the same acousto-optical modulator rendering the conventionally used swinging positioning mirror to be unnecessary.

These advantages cannot be achieved with conventional acousto-optical equipment.

The object of the present invention is to provide a circuit arrangement for controlling an acousto-optical cell that on the basis of the acousto-optical modulator used in the DE-OS No. 2 755 575 can provide for the accomplishment of the above sketched requirements without the need of using additional active optical devices.

SUMMARY OF THE INVENTION

The object of the invention is attained by providing a circuit arrangement for controlling a multi-beam acousto-optical cell in which Bragg diffraction is used for the generation of a plurality of outgoing laser beams, wherein the acousto-optical cell comprises at least one ultrasonic transducer and its outgoing beams fall in a common plane, and the circuit arrangement comprises high frequency oscillators with operational frequencies falling in the VHF to UHF bands, the oscillators are coupled through associated control stages to the at least one ultrasonic transducer, and it is true for each of the oscillators that its frequency determines the diffraction angle of one of the outgoing laser beams and its amplitude exerts an influence of the intensity of this beam. According to the invention at least one of the high frequency oscillators is an oscillator with adjustable frequency and has a frequency determining control input.

According to a feature of the invention, the acousto-optical cell comprises a plurality of electrically separated ultrasonic transducers and to each of the transducers at least one control stage is connected.

For the purpose of simultaneously adjusting the diffraction angle of all of the outgoing laser beams coming out from the acousto-optical cell, in the paths stretching between the control stages and the associated ultrasonic transducers respective mixers are connected, and the mixers have second inputs coupled to a common auxiliary oscillator with adjustable frequency.

The circuit arrangement according to the invention provides for the simultaneous generation of outgoing laser beams with constant and adjustable diffraction angles, in which all of the outgoing laser beams lie in a common plane.

The circuit arrangement according to the invention can have general application with acousto-optical modulators, when there is a need for the simultaneous generation of laser beams having constant and adjustable diffraction angles which beams originate substantially from a common point source.

BRIEF DESCRIPTION OF THE DRAWING

The invention will now be described with reference to the accompanying drawing. In the drawing:

FIG. 1 is a block diagram of a first embodiment of the circuit arrangement according to the invention;

FIG. 2 is a block diagram of a second embodiment of the circuit arrangement according to the invention;

FIG. 3 shows the block diagram of a third embodiment of the circuit arrangement according to the invention;

FIG. 4 is a time diagram valid for any of the circuit arrangements shown in FIGS. 1 to 3 illustrating the diffraction angles of the outgoing laser beams for a predetermined control of the oscillators;

FIG. 5 shows an improvement on the circuit arrangement of FIG. 3, in which the diffraction angle of all of the outgoing laser beams can also be adjusted simultaneously; and FIG. 6 is a diffraction angle-time curve similar to that shown in FIG. 4 illustrating the operation of the circuit arrangement shown in FIG. 5.

SPECIFIC DESCRIPTION

FIG. 1 shows an acousto-optical modulator where comprises an acousto-optical cell 2 consisting of a transparent optical medium in the form of a rectangular block and of ultrasonic transducers 3. The function of the acousto-optical cell 2 is to generate a plurality of separate outgoing laser beams 8, 11 from an incidental main laser beam 1 in accordance with a predetermined control program. The main laser beam 1 enters through the smaller end face of the oblong-shaped prismatic acousto-optical cell 2 which face lies parallel to the plane of propagation of the ultrasonic waves in the cell, and the main beam 1 includes an angle 4, the so called Bragg angle, with the longitudinal axis of the cell. The ultrasonic transducers 3 are separated electrically from each other and they are placed in succession along the lower surface of the acousto-optical cell 2 in the direction of propagation of the incident main laser beam 1. The length of the ultrasonic transducers 3 measured along the path of the laser beams is sufficient to ensure that any ultrasonic transducer 3 can generate an ultrasonic field in the acousto-optical cell 2, i.e. in the medium capable of a Bragg-type acousto-optical light diffraction. If the acousto-optical medium is made of a material in which the velocity of propagation of ultrasonic waves is low (e.g. water, or the single crystal of $TeO_2$ as a paratellurite in the crystalline direction defined by the Miller indices (1, 1, 0), or a $Mg_2Cl_2$ single crystal (calomel) in the crystalline direction of (1, 1, 0), then the length of the ultrasonic transducers 3 can be as short as 1 to 3 mm.

It is characteristic to the acousto-optical cell 2 made according to the above defined conditions that if its ultrasonic transducers 3 are driven by outputs of high frequency oscillators in an appropriate frequency range, then owing to the diffraction that takes place in the acousto-optical medium, outgoing laser beams 8, 11 will be generated from the incoming main laser beam 1, and the path of the outgoing laser beams 8, 11 will be diverted relative to the outgoing path of the main beam 1, the extent of the angular diffraction depending on the frequency (or frequencies) of the corresponding driving high frequency signal coupled to the ultrasonic transducer 3, and in case of a driving signal of predetermined frequency, the intensity of the corresponding outgoing laser beam 8 or 11, that has a diffraction angle defined by the predetermined frequency, will depend on the amplitude of the driving signal. This condition is valid for every ultrasonic transducer 3, that is each of the ultrasonic transducers can be driven by one or more high-frequency oscillators, and then within certain limits regarding the effect of generation of the outgoing laser beams the driving frequency signals have independent roles. The linear independency of the ultrasonic transducers on the generated diffracted outgoing laser beams provides the possibility of driving more than one ultrasonic transducer 3 with oscillators having a common frequency, and in that case each of these ultrasonic transducers 3 provides for respective diffractions in the acousto-optical medium, in which each of the so generated outgoing laser beams 8, 11 will have the same angle of diffraction determined by the common frequency, i.e. virtually a common outgoing laser beam will be generated that will have an intensity determined by the combined energy of the separate driving signals.

Since the ultrasonic transducers 3 are substantially equivalent regarding the generation of the outgoing diffracted laser beams 8, 11, the acousto-optical cell 2 shown in the drawing can be considered hypothetically as if it were equipped with a single ultrasonic transducer with increased power capacity into which independent high frequency oscillators were coupled that have independent effects on the generation of the diffracted laser beams. The separation of the ultrasonic transducers 3 is required because due to the limited electrical performance of the electrical circuit elements (owing to the generation of intermodulation products and to the attenuation of summing circuits) only a limited number of high frequency oscillators with limited output power can be coupled to an ultrasonic transducer.

The above features are valid not only in case of acousto-optical modulators as shown in FIGS. 1 to 3 and 5, in which the ultrasonic transducers 3 are formed in a common plane on a lateral surface of the prismatic block of the cell, but the transducers can be arranged in different parallel planes, or alternatively the acousto-optical cell 2 can be implemented by a number of independent cells optically coupled to each other. The actual design of the acousto-optical cell 2 does not fall within the scope of the present invention, and in case of the present invention any kind of acousto-optical cell can be used that has one or more ultrasonic transducers, if it can provide for the above described linear independency in view of the generation of the outgoing laser beams.

It should be noted, that the output power of the high frequency oscillators which drive the ultrasonic transducers should be chosen in such a way that the effect of additional diffractions of the already diffracted laser beams caused by ultrasonic fields of other transducers within the acousto-optical medium of the cell should be kept in a negligible level. This condition is met when the combined intensity of all of the diffracted outgoing laser beams is less than about 40% to 50% of the intensity of the incoming main laser beam 1. In that case each outgoing diffracted laser beam obtains its energy from the main laser beam 1.

FIGS. 1, 2, 3 and 5, show alternative embodiments for controlling the acousto-optical cell 2. In these figures those elements which have substantially equivalent functions regarding the control of the cell are designated by respective blocks of dashed lines. These elements take part in the control of different ultrasonic transducers 3 and are electrically independent from each other. The common designation indicated by the dashed line refers to the identical functional task.

In FIG. 1 a plurality of high frequency oscillators 5 with respective predetermined constant frequencies and a plurality of high frequency oscillators 10 with adjustable frequencies are shown. During operation the frequency of each oscillator 5 is constant and it is different from the frequency of any other oscillator 5. The frequencies of the respective oscillators 5 are designated with symbols, $f_1, f_2, \ldots f_M$. On the other hand the oscillators 10 with adjustable frequencies are designed in such a way that their operational frequencies can be changed within certain limit values in response to respective voltage signals applied to frequency-determining inputs 13 associated with the oscillators 10. Preferably the operational frequency bands of the adjustable oscillators 10 are chosen in such a way that the bands do not overlap each other, and the first adjustable frequency oscillator 10 will have a frequency band with lower and upper limit frequencies $f_{a1}$ and $f_{a2}$ and the last "n"-th oscillator will have lower and upper limit frequencies $f_{n1}$ and $f_{n2}$. The role of the appropriate selection of the bands will be explained later.

A respective control stage 6 is coupled to each of the high frequency oscillators 5 and 10. In a preferred embodiment the control stages 6 are electronic switches, which in response to control inputs 9 associated therewith permit or inhibit the passage of the oscillator outputs towards the ultrasonic transducers. The control stages 6 can also be implemented in such a way that in addition to or instead of the above described on-off control they can change the output voltages coupled from the oscillators towards the ultrasonic transducers. The control inputs of the control stages associated with the oscillators 10 with adjustable frequencies have been designated by reference number 12.

Each of the control stages 6 is coupled through a respective amplifier 7 to one of the ultrasonic transducers 3. The amplifiers 7 increase the outputs of the oscillators to a suitable level and act as buffer stages between the oscillators and the ultrasonic transducers.

When the circuit arrangement shown in FIG. 1 is operating, each of the constant frequency oscillators 5 generates a respective outgoing laser beam 8, and the diffraction angle α of these outgoing beams 8 depends on the predetermined constant frequency of the associated oscillator. When the adjustable frequency oscillators 10 have non-overlapping frequency bands which differ from the frequencies of the oscillators 5, then each of the oscillators 10 generate a respective outgoing laser beam 11 which has an adjustable diffraction angle differing from that of the constantly diffracted outgoing laser beams. In operation the diffraction angles of the laser beams 11 are changed within respective angle ranges corresponding to the frequency bands of the associated oscillators 10. With the above conditions the diffraction angle of each of the outgoing laser beams 8 and 11 will be different i.e. the path of the outgoing laser beams will not cross each other. The control applied to the control stages 6 and the control of the frequency determining inputs 13 determine together the path of the outgoing laser beams in accordance with operational requirements.

FIG. 2 shows an arrangement similar to that shown in FIG. 1 and the difference lies in that linear adders 14 are coupled between the respective control stages 6 and the amplifiers 7. The linear adders 14 are linear summing circuits with a plurality of inputs, and each of these inputs is coupled to the output of a respective control stage 6. By using the adders 14 the number of the oscillators that can be coupled to an ultrasonic transducer 3 can be increased according to the number of the adder inputs. In the example shown in FIG. 2 each adder 14 comprises m inputs, and n group has been formed by the constant frequency oscillators 5, therefore the frequency of the last one of the oscillators will be $f_M$, in which M=n·m.

The inputs associated with the last ultrasonic transducer 3 are connected with outputs of control stages 6 driven by adjustable frequency oscillators 10. Owing to the fact that the adders 14 are linear elements, and according to the above described condition relating to the acousto-optical cell 2 stating that each of the ultrasonic transducers 3 has the same effect on the generation of the diffracted outgoing laser beams, the circuit arrangement shown in FIG. 2 does not differ in its operation from that shown in FIG. 1 but it enables the application of more oscillators.

FIG. 3 shows a further possible embodiment of the invention. Here the difference compared to FIG. 2 lies in that the adjustable frequency oscillators 10 are not coupled now to a single common adder 14, but one input of each adder 14 is coupled to a respective one of the oscillators 10. For the sake of precision it must be noted that the number of the inputs of the adders 14 shown in FIG. 3 is with one input greater than the number of the inputs of the adders 14 shown in FIG. 2.

From the above refferred linearity condition it will be clear for the man skilled in the art that other combinations than shown in FIGS. 1 to 3 can well be designed, e.g. each adder 14 can receive more than one of the adjustable oscillators 10, etc. In the most simple design the acousto-optical cell 2 can comprise only two ultrasonic transducers 3, in which one of the two is coupled to a constant frequency oscillator 5 and the other to an adjustable frequency oscillator 10 (according to the arrangement shown in FIG. 1). In a similarly simple design the acousto-optical cell 2 can comprise only a single ultrasonic transducer 3 to which a linear adder 14 is coupled, and a first input of this adder is coupled to a constant frequency oscillator 5 and a second input is coupled to an adjustable frequency oscillator 10. In practice, however, the number of the constant frequency oscillators is seven or more.

FIG. 4 shows the time function of the diffraction angles of the outgoing laser beams 8 with constant diffraction angles and of the laser beams 11 with adjustable diffraction angles in case of an exemplary control. The control illustrated in FIG. 4 can be carried out by any of the circuit arrangements shown in FIGS. 1 to 3.

In FIG. 4 the control diagram of eleven outgoing beams with constant diffraction angles and of three outgoing beams with adjustable diffraction angles is shown. The left vertical axis represents the diffraction angles α and the right vertical axis the frequencies of the associated oscillators. The frequencies of the constant frequency oscillators 5 are divided in two groups. The first group comprises the frequencies $f_1$ to $f_4$ that correspond to a deflection range 8b. The second group comprises the frequencies $f_5$ to $f_{11}$ which is associated with a deflection range 8a. Within the deflection ranges 8a and 8b each outgoing laser beam has a constant diffraction angle, and the associated control stages 6 can exert an influence only on the establishment or inhibition (in given cases also on the intensity) of the tracking path of these beams. It can be seen in FIG. 4 that each of the (in the given case three) outgoing laser beams 11 with adjustable diffraction angle takes a respective angle range 11a, 11b or 11c. In the example shown in FIG. 4 triangular voltage signals of different frequencies are supposed to be coupled to frequency determining inputs 13 of the adjustable frequency oscillators 10. If all outgoing laser beams are deflected parallel to the horizontal time axis of FIG. 4, then the curve will show also the tracking path of the beams. When the frequency of the triangular voltage signal is sufficiently high, the laser beams 11 with adjustable angles can completely illuminate respective tracking bands, and this feature is advantageous in certain fields of applications (e.g. for the coverage of spaces between lines or of complete tracking bands). Of course, there is a possibility of adjusting the respective bands (or ranges) to overlap each other or to have spacing between them.

FIG. 5 shows a further embodiment of the circuit arrangement according to the invention. This embodiment is developed substantially from the circuit shown in FIG. 3, and the difference is, that mixers 15 are coupled between the linear adders 14 and the amplifiers 7. Each of the mixers 15 comprises first and second inputs 16 and 17. Each first input 16 is connected to the output of the adder associated with the corresponding mixer. The second inputs 17 are all connected in parallel and coupled to the output of an auxiliary oscillator 18 that has adjustable frequency. The frequency of the auxiliary oscillator 18 can be adjusted within a band defined between limit frequencies $F_1$ and $F_2$ by applying an appropriate voltage to a control input 19 thereof. The mixers 15 supply the difference or sum frequency of the high frequency signals coupled to their first and second inputs 16 and 17, and the so obtained product signal drive the ultrasonic transducers 3 of the acousto-optical cell 2. Preferably the amplifiers 7 are tuned band amplifiers which enable the passage only of the frequency components in the desired range to the ultrasonic transducers 3 which latter have also band-pass characteristics. It is preferable when the frequencies are adjusted so that the difference frequencies fall in the operational range of the ultrasonic transducers 3.

FIG. 6 is a time diagram of the diffraction angle of the outgoing laser beams which is similar to the diagrams of FIG. 4, and it illustrates the application of the circuit according to FIG. 5, and for the sake of better visualisation a specific control voltage was supposed to be applied to the control input 19 of the auxiliary oscillator 18, and its output frequency F corresponds to this voltage signal. It can be seen in FIG. 6 that the configuration illustrated in FIG. 4 follows the shape of the control voltage of the auxiliary oscillator 18, i.e. all outgoing laser beams will simultaneously and uniformly be deflected.

The so obtained beam deflection (offset) can be used for the common correction of the position of the outgoing laser beams, or for their fine position arrangement. If the acousto-optical modulator is used in a laser operated character generator, then the outgoing laser beams define e.g. the vertical points of a pattern or of a character, and the deflection of the laser beams perpendicular to their direction of propagation results in the writing of a line of characters. By means of the control of the auxiliary oscillator 18, the position of the characters perpendicular to the direction of the line deflection (e.g. their vertical position) can be finely adjusted.

It can be seen in FIGS. 4 and 6 that the circuit arrangement according to the invention makes it possible that in addition to the outgoing laser beams leaving the acousto-optical cell 2 conventionally with respective constant diffraction angles, additional outgoing laser beams can also be generated that propagate in the same plane as the conventional laser beams with constant angles, but their angular deflection (i.e. tracking path) can be adjusted. The invention provides also for the common position adjustment of all of the outgoing laser beams with the same plane of propagation. Both of these possibilities can have a number of uses in most fields of applications of the acousto-optical modulators, in particularly in laser operated character generators or in laser operated facsimile equipment.

We claim:

1. An apparatus for generating a variety of laser-beam patterns which comprises:
   a Bragg diffraction acousto-optical cell having an input end and an output end;
   means for directing a laser beam into said cell at said input end of said acousto-optical cell whereby said laser beam traverses said cell and can be diffracted therein to produce a plurality of output laser beams emerging from said output end of said acousto-optical cell;
   a plurality of ultrasonic transducers integral with said cell and spaced apart between said input end of said cell and said output end of said cell, the number of said transducers being equal at most to the number of said output beams, said ultrasonic transducers being electrically activatable to generate respective ultrasonic waves in said cell to cause Bragg diffraction of the laser beam traversing said cell and produce said output beams;
   a group of constant-frequency oscillators equal in number at most to the number of said output beams and of differing frequencies, said oscillators being connected to respective ones of said transducers for applying electrical signals thereto to enable said transducers to diffract the laser beam traversing said cell within a respective diffraction-angle range and produce a respective one of said output laser beams;
   at least one variable-frequency oscillator having a frequency-determining control input and connected to one of said transducers assigned to one of said output laser beams, said variable-frequency oscillator having a variable-frequency range nonoverlapping with those of said constant-frequency oscillators producing said output beams for producing at least one further output laser beam;
   means for applying an alternating signal to said control input of said variable-frequency oscillator to continuously deflect said further output beam in response to said alternating signal; and
   a respective control state between each oscillator and the respective transducer for modulating the signal transmitted between the respective oscillator and transducer, each control state having a respective control input for receiving modulating signals.

2. The apparatus defined in claim 1, further comprising respective electrical amplifiers coupled to each of said transducers for amplifying the signals driving said transducers.

3. The apparatus defined in claim 2, further comprising: a respective mixer connected ahead of each of said amplifiers, each of said mixers comprising a pair of inputs, a first of which is coupled to a respective control stage, and a second of which is connected to an auxiliary oscillator with adjustable frequency by which diffraction angles of all of said outgoing diffracted laser beams can be adjusted simultaneously according to a predetermined control signal controlling said auxiliary oscillator.

4. The apparatus defined in claim 3 wherein said amplifiers have band-pass transmission characteristics.

5. The apparatus defined in claim 1 in which said acousto-optical cell has a plurality of substantially equivalent electrically separated ultrasonic transducers.

6. The apparatus defined in claim 1 in which several control stages are coupled through common linear adders to each of said ultrasonic transducers.

7. The apparatus defined in claim 1, claim 2, claim 3 or claim 4 wherein a plurality of such variable-frequency oscillators are provided in a second group independently of said first group, said variable-frequency oscillators having different frequency ranges and frequency ranges which are non-overlapping with the frequencies of the oscillators of said first group, each of said variable-frequency oscillators having a control input for receiving a control signal determining the frequency thereof, each of the control inputs of said variable-frequency oscillators being connected to a source of a respective alternating signal, each of said variable-frequency oscillators being coupled to a respective transducer of said cell.

* * * * *